US011198337B2

(12) United States Patent
Bastyr et al.

(10) Patent No.: US 11,198,337 B2
(45) Date of Patent: Dec. 14, 2021

(54) METHOD AND APPARATUS FOR A LOW COST, ACOUSTIC TIRE CAVITY RESONANCE CANCELLATION

(71) Applicant: HARMAN INTERNATIONAL INDUSTRIES, INCORPORATED, Stamford, CT (US)

(72) Inventors: Kevin J. Bastyr, Franklin, MI (US); James May, Milford, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 269 days.

(21) Appl. No.: 15/911,553

(22) Filed: Mar. 5, 2018

(65) Prior Publication Data
US 2019/0270350 A1 Sep. 5, 2019

(51) Int. Cl.
*B60C 23/06* (2006.01)
*G10K 11/178* (2006.01)

(52) U.S. Cl.
CPC ........ *B60C 23/062* (2013.01); *G10K 11/1781* (2018.01); *G10K 11/1785* (2018.01);
(Continued)

(58) Field of Classification Search
CPC ..... B60C 23/06; B60C 23/061; B60C 23/062; B60C 23/063; B60C 23/064; B60C 23/065; B60C 23/08; B60C 23/085; G10K 11/1781; G10K 11/178; G10K 11/175; G10K 11/172; G10K 11/16; G10K 11/1785; G10K 11/17813; G10K 11/17815; G10K 11/17817; G10K 11/17821; G10K 11/17823; G10K 11/17825; G10K 11/1783; G10K 11/17883; G10K 11/17881; G10K 11/17879; G10K 11/17875; G10K 11/17873; G10K 2210/12;
(Continued)

(56) References Cited

U.S. PATENT DOCUMENTS 5,325,437 A 6/1994 Doi et al.
5,596,141 A * 1/1997 Nishikawa ............ B60C 23/061
340/448
(Continued)

FOREIGN PATENT DOCUMENTS

DE 19723516 C1 * 10/1998 ........... B60C 19/002
EP 2133866 A1 12/2009

OTHER PUBLICATIONS

Mohamed et al "A survey of wheel tyre cavity resonance noise", hereinafter Mohamed, Int. J Vehicle Noise and Vibration, vol. 9, Nos. 3/4, Jul. 2013, pp. 276-293 (Year: 2013).*
(Continued)

*Primary Examiner* — Leshui Zhang
(74) *Attorney, Agent, or Firm* — Brooks Kushman P.C.

(57) ABSTRACT

A sensor is configured to infer a rotational speed of a tire of a vehicle. A frequency generator is configured to synthesize frequencies of a tire cavity resonance according to the rotational speed of the tire to generate a sense signal. An active noise control filter is configured to generate an antinoise signal from the sense signal. A loudspeaker configured to convert the antinoise signal into antinoise and to radiate the antinoise to a listening position. The antinoise signal is configured so that the antinoise reduces sound of the tire cavity resonance at the listening position.

16 Claims, 9 Drawing Sheets

(52) U.S. Cl.
CPC .... *G10K 11/17883* (2018.01); *G10K 2210/12* (2013.01); *G10K 2210/12821* (2013.01); *G10K 2210/3032* (2013.01); *G10K 2210/511* (2013.01)

(58) Field of Classification Search
CPC ........ G10K 2210/121; G10K 2210/128–1291; G10K 2210/3032; G10K 2210/511; G10K 2210/512; G10K 15/02; G10K 2210/30232; G10K 2210/129; G10K 2210/1282; G10K 11/17853; B64C 2220/00; H04R 3/12; H04B 3/23
USPC ... 381/71.1, 71.8, 71.11, 71.12, 302, 86, 91, 381/92, 94.1, 94.2, 94.3, 94.7, 95, 96, 97, 381/98, 99, 100, 101, 102, 103, 111, 112, 381/113, 114, 115, 120, 121, 122; 327/551, 552, 553, 555, 560; 704/E21.007, E21.02; 455/570; 700/94
See application file for complete search history.

(56) References Cited

U.S. PATENT DOCUMENTS

| | | | |
|---|---|---|---|
| 7,613,529 B1* | 11/2009 | Williams | H04R 3/02 381/94.3 |
| 2010/0014685 A1* | 1/2010 | Wurm | G10K 11/17885 381/71.11 |
| 2016/0109062 A1* | 4/2016 | Antonakakis | F01M 11/0004 701/36 |

OTHER PUBLICATIONS

Hiroshi et al "Theoretical analysis of tire acoustic cavity noise and proposal of improvement technique", Society of Automotive Engineers of Japan, Inc., Elsevicer Science B.V. JSAE Review vol. 23, p. 89-94, (Year: 2002).*
Duan, Active Control of Vehicle Powertrain and Road Noise, Dissertation, University of Cincinnati, Jun. 1, 2011.
Zafeiropoulos et al., Active Control of Structure-Borne Road Noise Based on the Separation of Front and Rear Structural Road Noise Related Dynamics, SAE International Journal of Passenger Cars—Mechanical Systems, vol. 8, Issue 3 (Sep. 2015).

* cited by examiner

600

| Km/h | Axle RPM | Fh 1st | Fl 2nd |
|---|---|---|---|
| 0 | 0 | 232 | 228 |
| 15 | 125 | 233 | 227 |
| 30 | 250 | 234 | 226 |
| 48 | 400 | 239 | 224 |
| 65 | 540 | 241 | 223 |
| 80 | 670 | 242 | 222 |
| 100 | 800 | 245 | 220 |

*FIG. 6*

METHOD AND APPARATUS FOR A LOW COST, ACOUSTIC TIRE CAVITY RESONANCE CANCELLATION

TECHNICAL FIELD

Aspects of the disclosure generally relate to acoustic tire cavity resonance cancellation.

BACKGROUND

Road noise cancellation (RNC) technology reduces unwanted, typically broadband, road noise inside a vehicle by generating antinoise, i.e., sound waves that are substantially opposite in phase and identical in magnitude to the in-cabin road noise, in a similar manner to other active noise control (ANC) technologies. RNC technology uses vibration sensors to pick up unwanted structural vibrations generated by the interaction of the tires and the road surface that lead to unwanted noise in the passenger cabin. Tire cavity resonance is a significant contributor to this unwanted noise. The result of cancelling such road noise is a more pleasurable ride, and it enables vehicle manufacturers to use lightweight materials, thereby increasing fuel mileage and reducing emissions.

Engine order cancellation (EOC) technology uses a non-acoustic signal, such as a revolutions-per-minute (RPM) sensor, that generates a signal representative of the engine speed as a reference. This reference signal is used to generate sound waves that are opposite in phase to the engine noise audible in the vehicle interior. Because EOC systems use data from an RPM sensor, EOC systems do not require accelerometers.

SUMMARY

In one or more illustrative embodiments, a sensor is configured to infer a rotational speed of a tire of a vehicle. A frequency generator is configured to synthesize a frequency corresponding to a tire cavity resonance (TCR) frequency according to the rotational speed of the tire to generate a sense signal. An active noise control filter is configured to generate an antinoise signal from the sense signal. A loudspeaker is configured to convert the antinoise signal into antinoise and to radiate the antinoise to a listening position. The antinoise signal is configured so that the antinoise reduces noise due to the tire cavity resonance at the listening position.

In one or more illustrative embodiments, a tire cavity resonance control method includes inferring a rotational rate of a tire of a vehicle using a sensor; synthesizing a frequency of a tire cavity resonance of the tire, using a frequency generator, according to the rotation rate of the tire, to generate a sense signal; generating an antinoise signal from the sense signal using an active noise control filter; and converting, by a loudspeaker, the antinoise signal provided by the active noise control filter into antinoise and radiating the antinoise to a listening position.

In one or more illustrative embodiments, a tire cavity resonance noise control method includes finding a tire cavity resonance peak in a frequency range using a tracking filter receiving input from a sensor; identifying or inferring a rotational rate of a tire; and updating a tire cavity resonance cancellation lookup table that maps tire resonance frequency to tire rotational rate; wherein the tire cavity resonance cancellation lookup table is configured for use in generating an antinoise signal using an active noise control filter receiving a synthesized frequency of a tire cavity resonance of the tire according to the rotational rate of the tire.

BRIEF DESCRIPTION OF THE DRAWINGS

FIG. 6 illustrates an example TCR cancellation tuning table;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
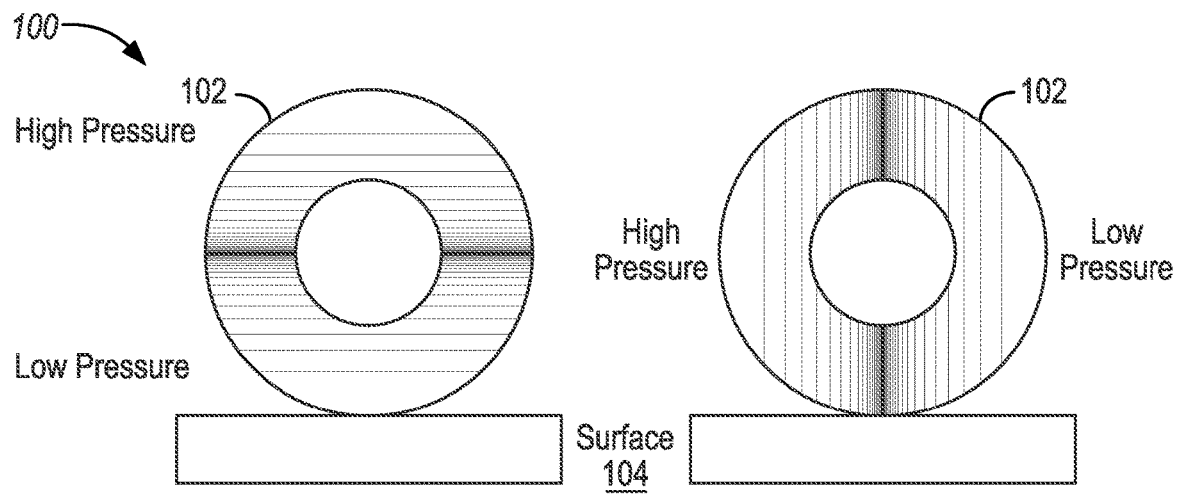
FIG. 1 illustrates an example diagram of an automobile tire rolling over pavement.

FIG. 1 illustrates an example diagram 100 of an automobile tire 102 rolling over a surface 104. When the tire 102 rolls over the surface 104 (e.g., pavement), the tire 102 generates audible sound. Some of the sound is generated due to the impact of the tire tread with the road texture. Tonal sound is caused by deformation of the tire 102 as it rolls, which excites the internal acoustic cavity resonance or resonances of the tire 102, which in turn imparts a mechanical vibration into the wheel hub and shaft. If the tire 102 is unloaded, it is fully round and there is only one internal resonance frequency and one mode shape. When the tire 102 is loaded by the weight of the vehicle, the unloaded degenerate mode splits into a lower and higher frequency mode, which have resonance frequencies referred to herein as Fl and Fh. Some or all of the sound and vibration generated by the interaction of the road surface 104 and tire 102 can travel to the location of the vehicle occupants' ears via both an airborne path and a structural path.

Figure 2:
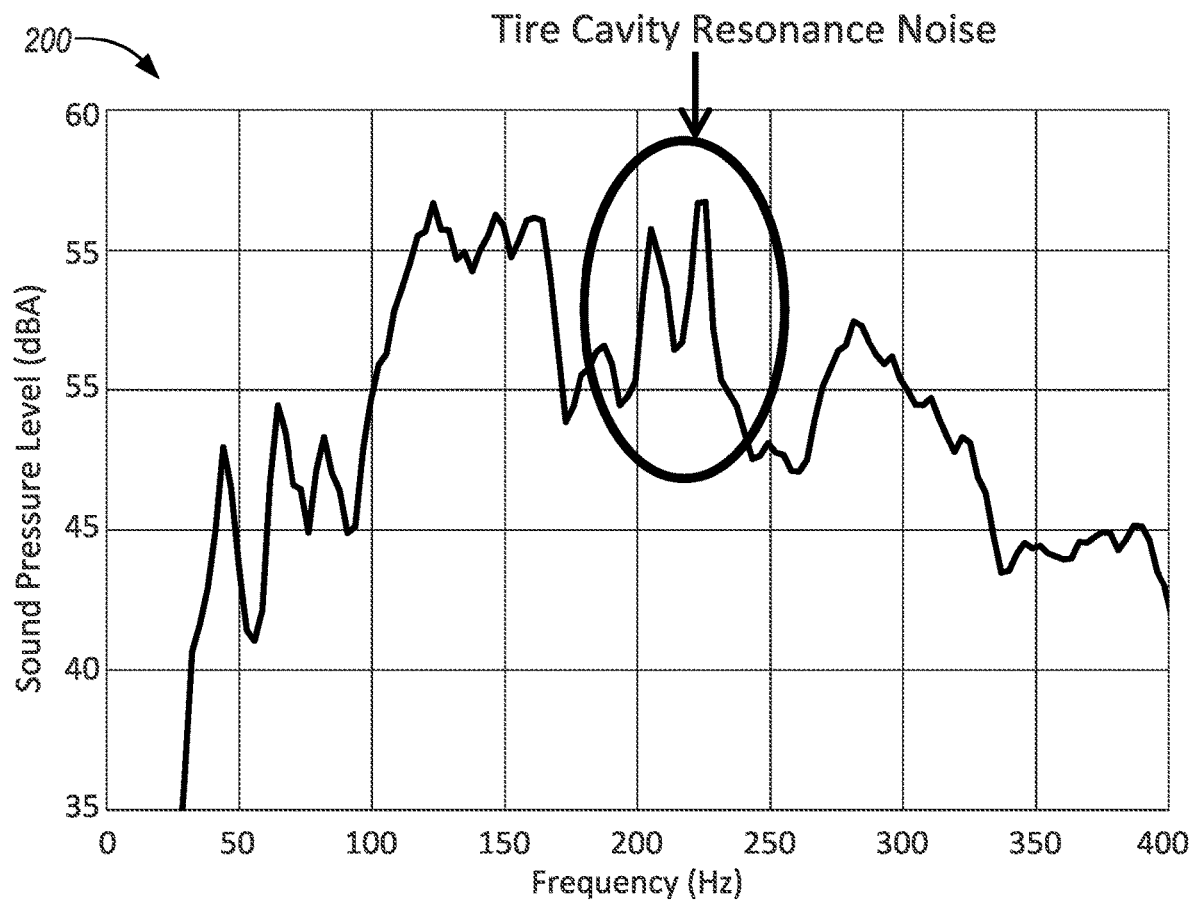
FIG. 2 illustrates an example graph of in-vehicle noise level by frequency.

FIG. 2 illustrates an example graph 200 of in-vehicle noise level as a function of frequency. Because tires 102 on passenger automobiles typically fall within a small range of diameters (e.g., near 16"), these resonance frequencies are near 225 Hz and typically fall between 190 Hz and 250 Hz. An example of the noise generated by the interaction of the tire with the pavement is shown in the graph 200, which is a plot of sound pressure level (SPL) in the passenger cabin, at the location of a passenger's ears.

Figure 3:
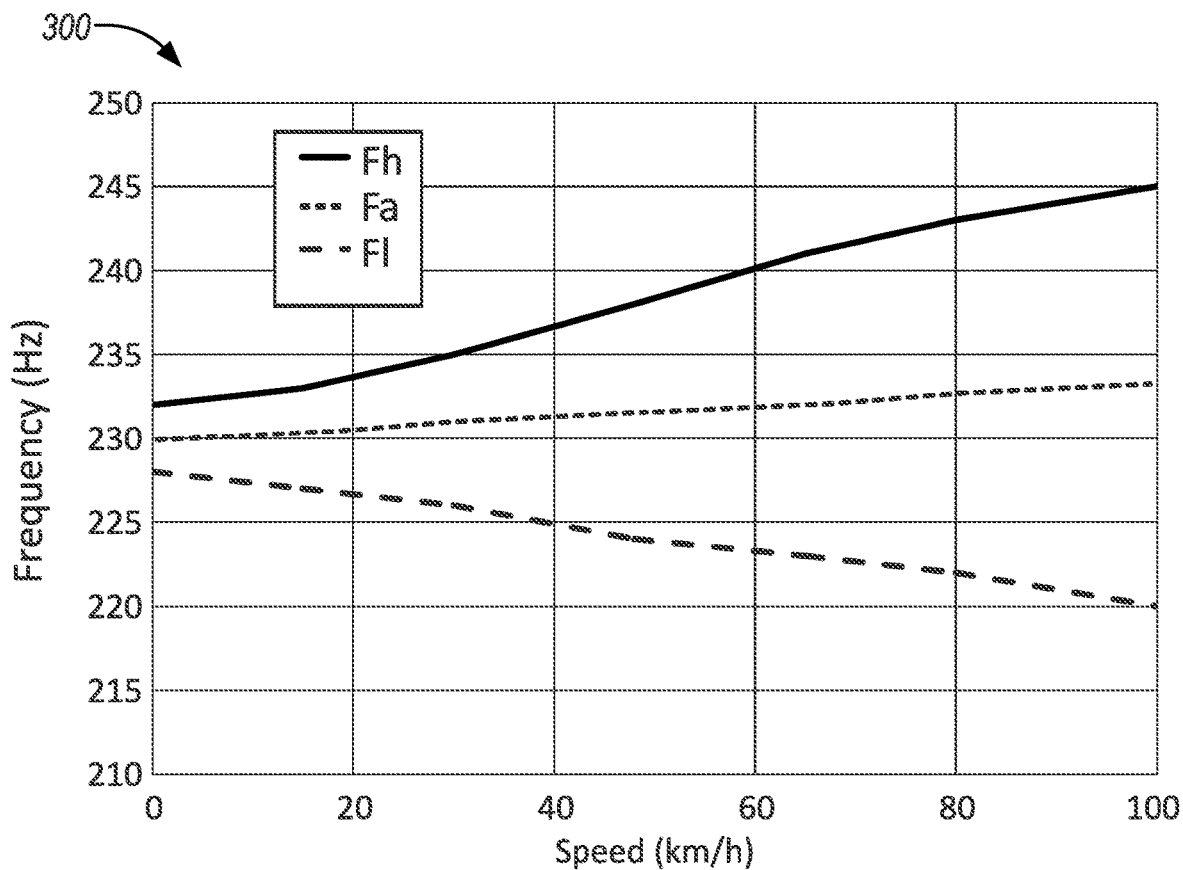
FIG. 3 illustrates an example graph of tire noise according to vehicle speed.

FIG. 3 illustrates an example graph 300 of tire 102 TCR frequencies as a function of vehicle speed. As shown in the graph 300, tire 102 Fh cavity resonance shifts very slightly upward with increasing vehicle speed, while Fl shifts very slightly downward with increasing vehicle speed. Notably, but not shown, tire 102 cavity resonance frequency is largely independent of inflation pressure, and so is largely independent of ambient temperature. This graph is exemplary in nature and note that not all vehicles exhibit this exact behavior of frequency shift with changes in speed.

One solution for cancellation of the TCR noise from tire 102 is via an RNC system. RNC systems generally cancel or reduce unwanted noise by generating cancellation sound waves to destructively interfere with the unwanted audible noise. The frequency and amplitude of the cancellation sound waves are, for the most part, identical to those of the noise, but the phase differs by 180 degrees in relation to the noise. In ideal situations, this method fully cancels the unwanted noise at a listening location or locations. Destructive interference results when noise and largely identical magnitude but opposite phase antinoise reduces the sound pressure level at a location. This effect of targeted reduction of the sound pressure level of an undesirable noise with the use of antinoise played over speakers is called active noise cancellation (ANC). In vehicles, the unwanted noise can be caused by the engine, the interaction of the tires 102 and the road surface 104, and/or sound radiated by the vibration of other parts of the vehicle and, therefore, varies with the speed, road conditions, and operating states of the vehicle.

In typical RNC systems, structure-borne vibration is monitored by sensors such as acceleration sensors, termed accelerometers. For example, accelerometers used as input vibration sensors may be disposed around the vehicle to monitor the structural behavior of the suspension and chassis components. RNC systems often utilize a broadband feed-forward Least Mean Squares (LMS) ANC framework in order to generate antinoise by adaptively filtering the signal from the vibration sensor or sensors to generate an antinoise signals that play though speakers in order to cancel the road noise. Vibration sensors may include acceleration sensors such as accelerometers, or may be force gauges, load cells, strain gauges, geophones, linear variable differential transformers, etc. For example, an accelerometer is a device whose output voltage is proportional to acceleration. Single and multi-axis accelerometers are available.

An example RNC system may use six two-axis accelerometers deployed around a vehicle on various vibrating suspension parts, in addition to four microphone error sensors deployed in the passenger cabin, in combination with an LMS ANC system requiring a large number of million-instructions-per-second (MIPS) of computational power. Typical cancellation of the 190-250 Hz tire cavity tone(s) using accelerometers mounted on the vehicle suspension and chassis is on the order of 5 to 10 dB at the location of a passenger's ears.

As mentioned above, EOC technology uses a non-acoustic signal such as an RPM signal representative of the engine speed as a reference in order to generate sound that is opposite in phase to the engine noise audible in the vehicle interior. Common EOC systems utilize a narrowband feed-forward ANC framework to generate antinoise using an RPM signal to guide the generation of an engine order identical in frequency to engine order to be cancelled, and adaptively filtering it to create an antinoise signal. After being transmitted via a secondary path from an antinoise source to a listening position, the antinoise ideally has the same amplitude, but opposite phase, as the combined sound generated by the engine and exhaust pipes and filtered by the primary paths that extend from the engine to the listening position and from the exhaust pipe outlet to the listening position. Thus, at the place where an error microphone resides in the vehicle cabin, i.e., most likely at or close to the listening position, the superposition of engine order noise and antinoise would ideally become zero so that acoustic error signal received by the error microphone would only record sound other than the (ideally cancelled) engine order or orders generated by the engine and exhaust.

Commonly, a non-acoustic sensor, for example an RPM sensor, is used as a reference. RPM sensors, may be, for example, Hall Effect sensors which are placed adjacent to a spinning steel disk. Other detection principles can be employed, such as optical sensors or inductive sensors. The signal from the RPM sensor can be used as a guiding signal for generating an arbitrary number of reference engine order signals corresponding to each of the engine orders. The reference engine orders form the basis for noise cancelling signals generated by the one or more narrowband adaptive feed-forward LMS blocks that form the EOC system.

Because most EOC systems are guided by data from an RPM sensor, most EOC systems do not require accelerometers or direct acoustic measurement of the engine order sound at the location of the engine. As EOC systems require only an input RPM signal, one or more interior cabin microphones, and a LMS ANC system, EOC systems require fewer MIPS as compared to RNC systems. Additionally, as compared to RNC systems, EOC systems do not require any accelerometers. Typical cancellation depth of low frequency engine orders by EOC systems is far better than RNC systems. EOC systems cancel on the order of ~20 dB of low frequency engine orders, while 10 dB of higher frequency orders is achievable.

RNC systems are typically designed to cancel broadband signals, while EOC systems are designed and optimized to cancel narrowband signals, such as individual sine tones. TCR noise is more accurately described as the latter, e.g., as a single tone or a combination of two tones. Thus, a modified EOC algorithm may be utilized to cancel sound due to the TCR. The system may utilize an additional or alternate RPM signal or signals (such as that of the axle of any of the tires), and a lookup table of wheel RPM vs. TCR frequency or frequencies.

Figure 4:
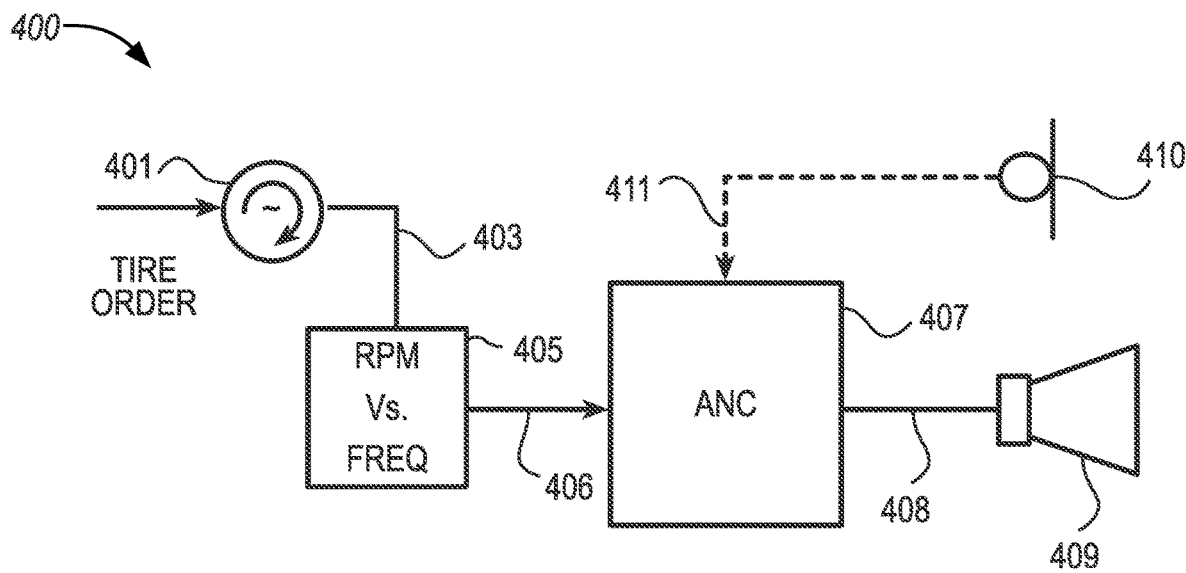
FIG. 4 illustrates an example TCR and road noise control system.

FIG. 4 illustrates an example TCR noise control system 400. The system includes an RPM sensor 401 which provides a square-wave signal indicative of rotation of the drive shaft or of an axle of the vehicle to which a tire is connected. As the TCR frequency or frequencies are directly or indirectly proportional to tire speed, the RPM signal is representative of the frequencies produced by the tire. The RPM sensor 401 is used in conjunction with a lookup table of RPM vs. frequency or frequencies 405. The frequency supplied to an ANC filter 407 (which is often termed W-filter in LMS systems) which provides a filtered signal 408 to a loudspeaker 409. The filtered signal 408, broadcast by the loudspeaker(s) 409 to a listening position (not shown), thereby generates antinoise at the listening position, i.e., sound with the same amplitude but opposite phase as the TCR frequency or frequencies that appear at the listening position, to reduce, or ideally, completely cancel the unwanted noise at the listening position. The ANC filter 407 may have a fixed or adaptive transfer function and may be adapted by a feedback system or a feedforward system or a combination thereof. Furthermore, an error microphone or microphones 410 may be employed, which pick up the residual noise at or near the listening position(s) and provides an error signal(s) 411 representative of the residual noise for use in optimizing the ANC filter 407. Though this diagram shows a system with a single RPM sensor, a single TCR frequency, a single microphone, a single ANC filter, and a single speaker, often EOC systems will include multiple of one or more of these components. Implementation of these slightly more complex systems are straightforward for those skilled in the art.

Figure 5:
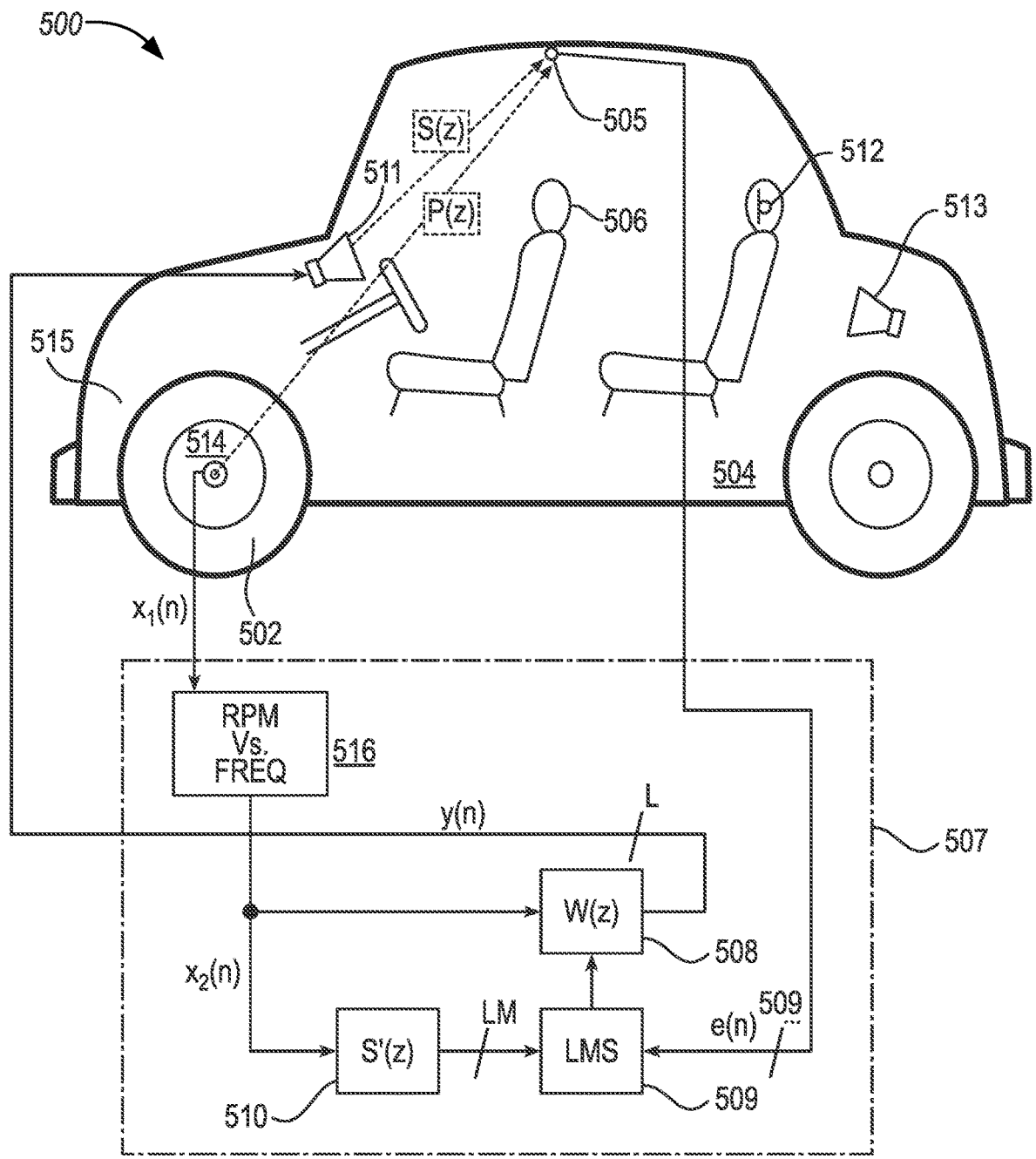
FIG. 5 illustrates a single-channel feedforward active road noise cancellation system with a least mean squares adaptive algorithm.

FIG. 5 illustrates a single-channel, feedforward, TCR noise cancellation system with an adaptive LMS algorithm. The road noise originating from the interaction of the pavement surface and wheel 502 is mechanically and/or acoustically transferred via a primary path to an error microphone 505 according to a transfer characteristic P(z). A TCR noise cancellation system includes an RPM sensor 514 which is mounted to an axle 515 of the vehicle 504. Alternately, this RPM sensor 514 can be mounted on other rotating shafts whose rotational rate is indicative of the rotational rate of one or more tires. The rotational speed of the tire correlates with the audible TCR noise within the vehicle cabin because the frequency or frequencies of the tire cavity resonances change in a deterministic way with tire RPM, detected by RPM sensor 514. The RPM signal $x1(n)$ may be a square-wave signal having the frequency of the tire rotation, though one may have to adjust this signal slightly as often 2 of the 60 pulses per revolution are missing. The RPM signal $x1(n)$ is used in conjunction with a lookup table 516 of RPM vs frequency or frequencies to provide estimated frequencies of the tire cavity noise. Further aspects of the lookup table 516 are described with reference to FIG. 6.

The error signal e(n) representing the sound, including noise and TCR noise, present in the cabin of the vehicle 504 is detected by error microphone 505 which may be arranged within the cabin in a headrest 506 of a seat (e.g., the driver's seat). Alternate locations for this microphone include the headliner of the vehicle, on the top of a seat back, or in other in-cabin locations that may be generally near passengers' ears. Although one microphone is shown in FIG. 5, typically systems for EOC or RNC include multiple error microphones. A transfer characteristic W(z) of a controllable filter 508 is controlled by adaptive filter controller 509 which may be an LMS based algorithm that adapts based on the error signal e(n) and on the signal $x2(n)$ filtered with a transfer characteristic S'(z) by a filter 510. S'(z) is a measurement of S(z), and S(z) represents the transfer function between the loudspeaker 511 and the microphone 505, i.e., the transfer function of a secondary path. Antinoise signal y(n) that, after having travelled through the secondary path, ideally has a waveform inverse in phase to that of the TCR noise audible within the cabin, near error microphone 505, is generated by an adaptive filter formed by controllable filter 508 and filter controller 509, based on the identified transfer characteristic W(z) and the signal $x2(n)$. Antinoise signal y(n) is played through loudspeaker 511, and, after it has travelled through the secondary path, creates sound with a waveform substantially opposite in phase and similar in magnitude to that of the TCR noise audible near the error microphone 505. The superposition of the antinoise with the noise audible in the cabin thereby reduces the TCR noise within the cabin, near microphone 505.

The exemplary system shown in FIG. 5 employs a straightforward single-channel feedforward LMS control system 507, but other control structures, e.g., multi-channel systems with a multiplicity of additional channels, a multiplicity of additional microphones 512, and a multiplicity of additional loudspeakers 513, may be applied as well. For example, in total, L loudspeakers and M microphones may be employed. Then, the number of microphone input channels into filter controller 509 is M, the number of output channels from filters 508 is L and the number of channels between filter 510 and filter control 509 is L·M. In addition, multiple RPM reference sensors 514 can be input into RPM vs. frequency or frequencies lookup table 516, thereby possibly creating more W(z) filters, and a more complex signal $x2(n)$.

FIG. 6 illustrates an example TCR cancellation tuning table 600. The example table 600 lists frequencies of each TCR for a given RPM. In the illustrated example, two frequencies are given, for both low and high frequency tire cavity resonances. These low and high frequencies correspond to the loaded tire lower and higher frequency modes Fl and Fh. While not shown, in another example a single center frequency between the low and high frequency modes may be used. The LMS algorithm takes as an input the RPM, and generates a sine wave for each order based on this lookup table 600. The LMS algorithm then adaptively adjusts the amplitude and phase of each sine wave by applying W-Filter 508 to achieve the minimum error pressure at the location of the microphone error sensors. The relevant RPM for the table 600 is axle rotation RPM of the axle of the tire 102. Note that while the shift in resonance frequency with speed is small, use of the lookup table aids in allowing the EOC algorithm to cancel these tones more effectively. Note also that a conversion factor has translated km/h into RPM for an example tire 102. For instance, the table 600 may be utilized with a conversion factor that the circumference of a 195/65 R15 tire is 78.4 inches, and that there are 39370.1 inches per kilometer.

Figure 7:
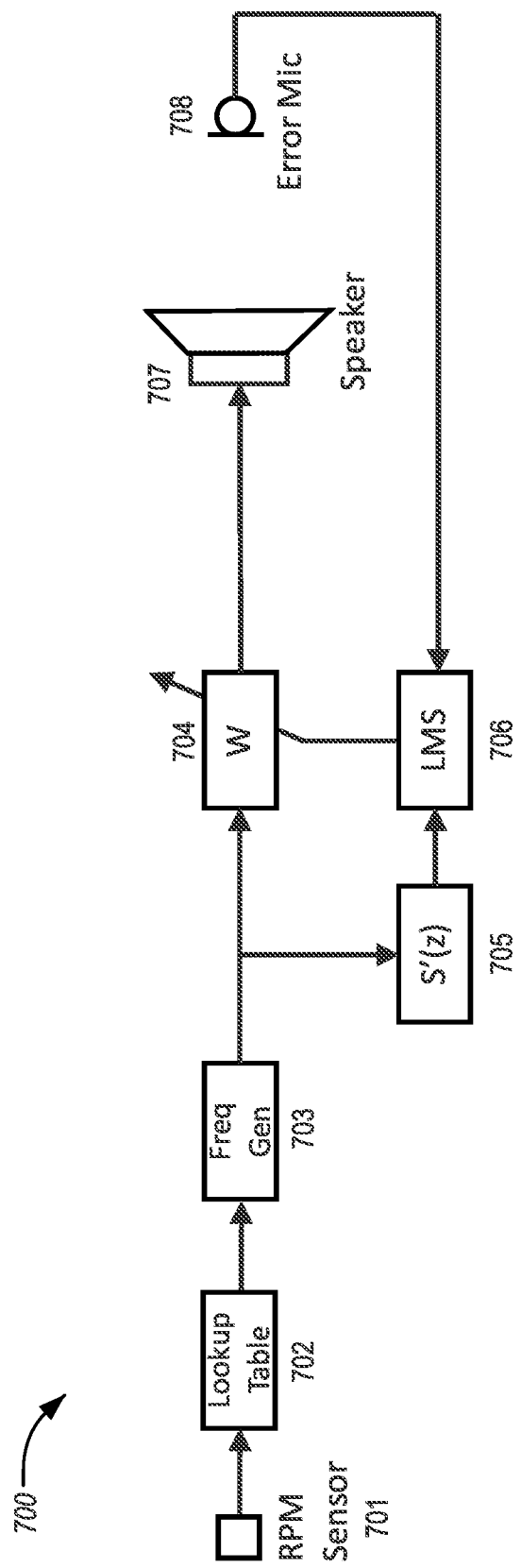
FIG. 7 illustrates an example schematic for a single TCR frequency noise cancellation system.

FIG. 7 illustrates an example schematic for a single TCR frequency noise cancellation system 700. In the TCR noise cancellation system 700, an RPM sensor 701 is used to provide a signal indicative of a rotational speed of the tire 102 or axle. This signal is processed via a lookup table 702 mapping rotational speed to TCR frequency. A frequency generator 703 synthesizes a sine wave at a frequency F according to the estimated frequency of the TCR identified via the lookup table 702. A transfer characteristic S'(z) indicated at 705 represents a transfer function of a secondary path between a loudspeaker 707 and a microphone 708. A transfer characteristic W(z) shown at 704 of a controllable filter is controlled by a LMS-based algorithm 706 that adapts based on an error signal e(n) received from the error microphone 708 and on the frequency signal filtered at 705 by the transfer characteristic S'(z).

Figure 8:
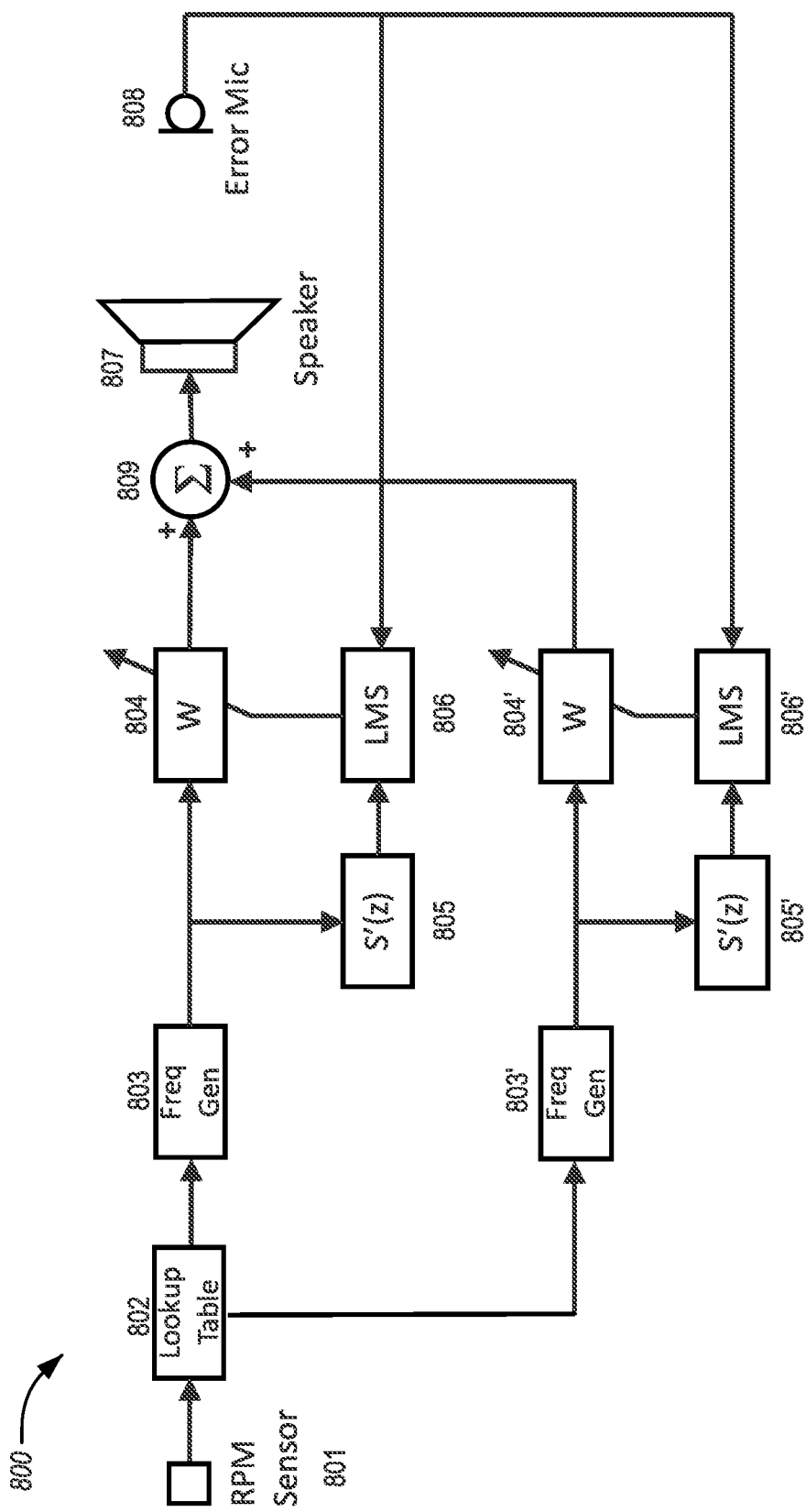
FIG. 8 illustrates an example schematic for a dual TCR frequency noise cancellation system.

FIG. 8 illustrates an example schematic for a dual TCR frequency noise cancellation system 800. Similar to the system 700, in the TCR noise cancellation system 800 an RPM sensor 801 is used to provide a signal indicative of a rotational speed of the tire 102 or axle. However, instead of being used to provide a single resonance frequency, in the system 800 the signal is processed via a lookup table 802 to provide estimated low and high frequency resonances of the tire noise. These low and high frequencies correspond to the loaded tire lower and higher frequency modes Fl and Fh.

A first frequency generator 803 synthesizes the resonance frequency Fl according to the estimated low frequency of the tire noise identified via the lookup table 802, while a second frequency generator 803' synthesizes the resonance frequency Fh according to the estimated high frequency of the tire noise identified via the lookup table 802. Transfer characteristics S'(z) indicated at 805 and 805' each represent a transfer function of the secondary path between a loudspeaker 807 and a microphone 808. A transfer characteristic W(z) shown at 804 of a controllable filter is controlled by a LMS-based algorithm 806 that adapts processing of resonance frequency Fl based on an error signal e(n) received from the error microphone 808 and on the frequency signal filtered at 805 with the transfer characteristic S'(z) of 805. A second transfer characteristic W(z) shown at 804' is controlled by a LMS-based algorithm 806' that adapts processing of resonance frequency Fh based on the error signal e(n) received from the error microphone 808 and on the frequency signal filtered at 805' with the transfer characteristic S'(z) of 805'. The outputs of the transfer characteristic W(z) 804 and the transfer characteristic W(z) 804' are combined at adder 809. This combined output of the adder 809 is played though speaker 807 to create sound with a waveform substantially opposite in phase and similar in magnitude to that of the TCR noise audible near microphone 808.

Figure 9:
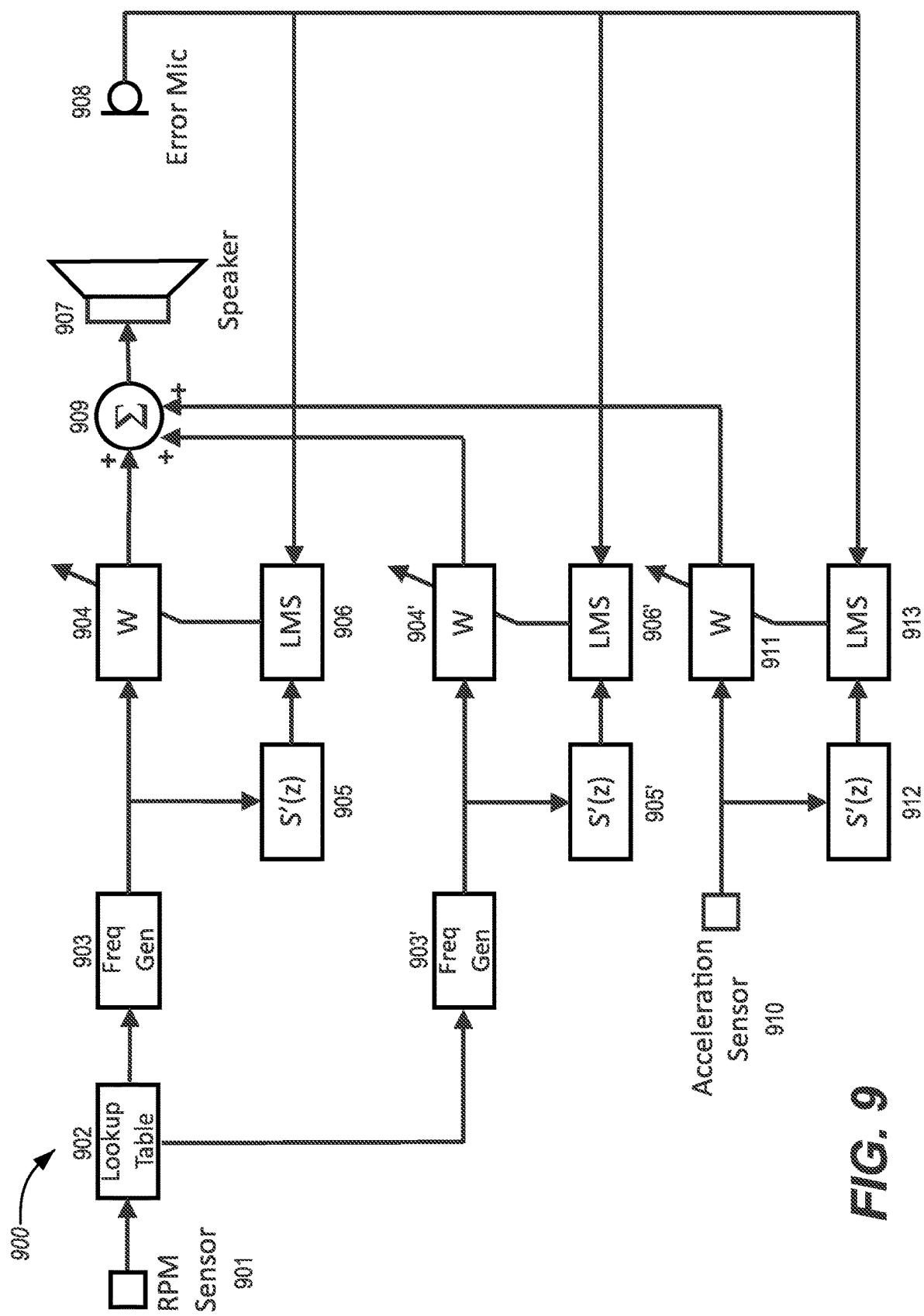
FIG. 9 illustrates an example schematic for a dual TCR frequency and broadband RNC system.

FIG. 9 illustrates an example schematic for a dual TCR frequency and broadband RNC noise cancellation system 900. Similar to the system 800, the noise cancellation system 900 utilizes the elements 901-909 consistent with operation of elements 801-809 discussed above. Additionally, the system 900 further includes an acceleration sensor 910. A sense signal output by acceleration sensor 910 is utilized by a broadband feed-forward ANC framework to generate antinoise by adaptively filtering the signal from acceleration sensor 910 to generate antinoise. A transfer characteristic S'(z) indicated at 912 also represents a transfer function of a secondary path between a loudspeaker 907 and a microphone 908. A transfer characteristic W(z) shown at 911 of a controllable filter is controlled by a LMS-based algorithm 913 to adapt based on an error signal e(n) received from the error microphone 708 and on the accelerometer signal filtered at 912 by the transfer characteristic S'(z). By combining the broadband road noise cancellation with the narrowband cancellation of tire resonance frequencies, cancellation depth of TCR noise can be improved beyond that possible using a traditional broadband RNC system. Note that in typical RNC systems, multiple acceleration sensors 910 are typically used, and their signals are combined in ways known to those skilled in the art. Similarly, typical RNC systems employ multiple error microphones 908 and multiple speakers 907.

Figure 10:
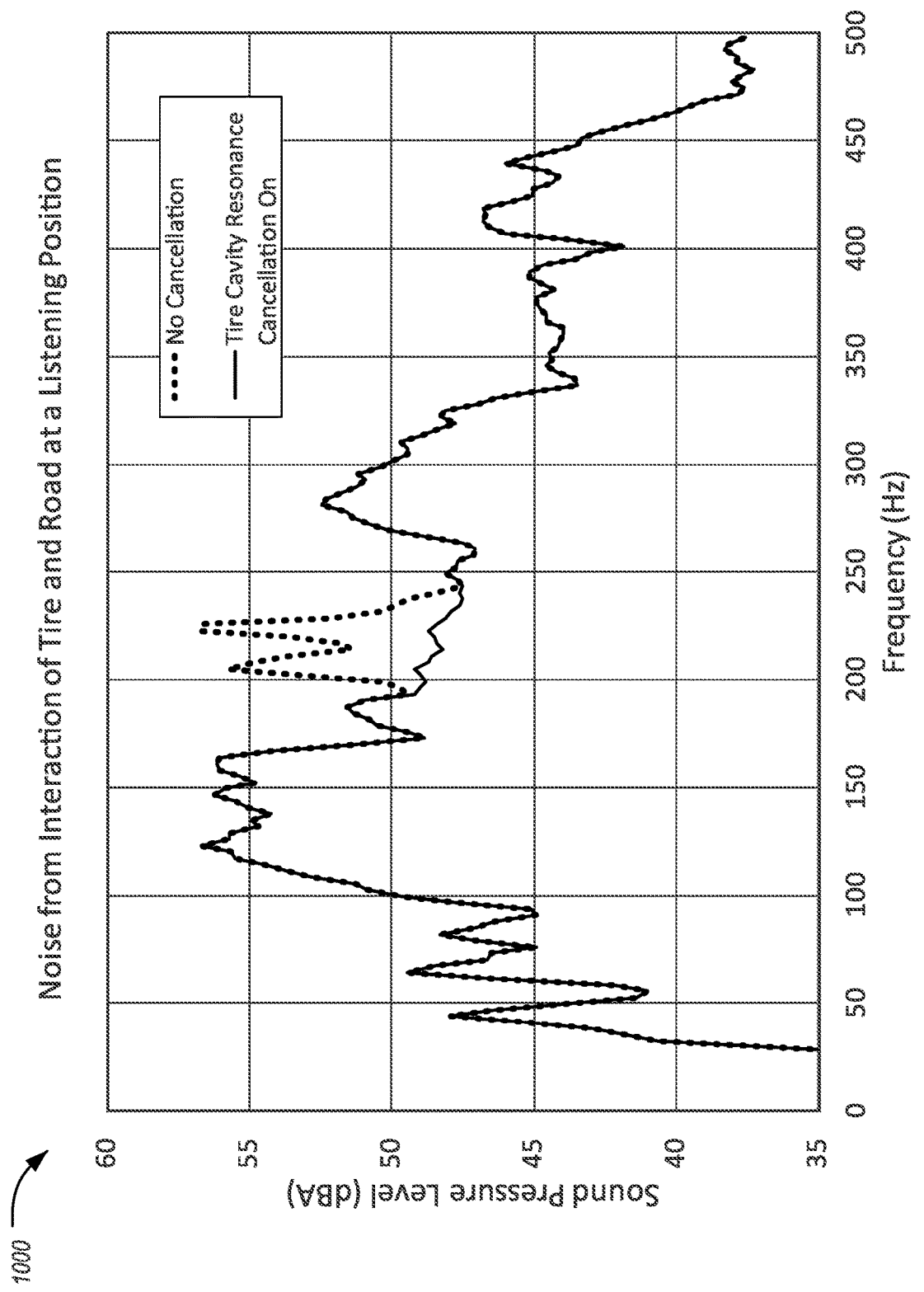
FIG. 10 illustrates an example of tire cavity noise cancellation depth achieved through use of TCR cancellation.

FIG. 10 illustrates an example graph 1000 of tire cavity noise cancellation depth achieved through use of TCR cancellation. As shown, the trace with TCR noise cancellation active (or on) achieves 6-10 dB of noise cancellation in the region of tire noise, e.g., from around 190-250 Hz.

Figure 11:
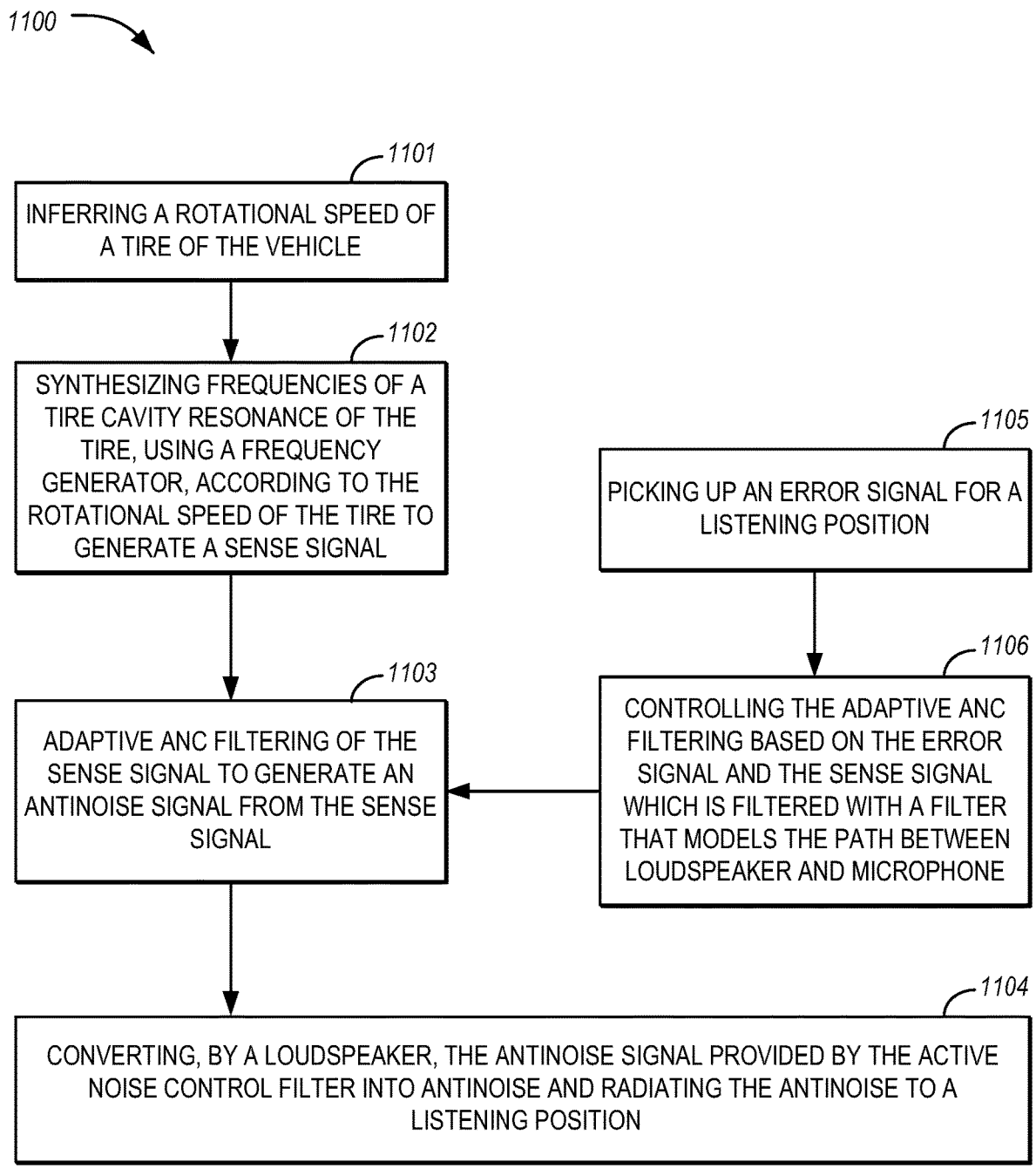
FIG. 11 illustrates an example TCR noise cancellation method.

FIG. 11 illustrates an example TCR and road noise control method 1100, as may be performed by one of the systems shown above. At operation 1101, the system infers a rotational speed of a tire of the vehicle. At operation 1102, the system synthesizes frequencies of a TCR of the tire, using a frequency generator, according to the rotational speed of the tire, to generate a sense signal or signals. At operation 1103, the system performs adaptive filtering on the sense signal or signals, e.g., according to the LMS algorithm, to generate a summed antinoise signal from the sense signal or signals. At operation 1104, the system converts the antinoise signal derived from the active noise control filtering into antinoise, e.g., by way of a loudspeaker, which is radiated to a listening position in an interior of the vehicle. At operation 1104, the antinoise signal is configured so that the antinoise reduces the TCR noise at the error microphone, which is likely near a listening position. At 1105, the system picks up an error signal at or close to the listening position, e.g., by way of a microphone. At operation 1106, the system filters the sense signal or signals with a filter or filters that models the path between loudspeaker and microphone used to control the LMS algorithm of the adaptive ANC filtering.

Variations on the example systems and methods are possible. In one example, the lookup table 600 may be dynamically adapted over time to improve the accuracy of the frequency estimate at each wheel RPM. This dynamic adaptation may be a complete replacement of this table, or may be a refinement of one more values in this table. This adaptation may occur once, or it may be more frequent. This could improve ideal cancellation for the system if a different tire/wheel size is substituted on the vehicle after its manufacture date. In an example, the dynamic adaptation may be performed using a microphone and to search for center frequencies of any relatively high Q peaks between approximately 180 and 260 Hz. In another possibility, the frequency generator and frequency data in the lookup table 600 could be replaced by one or more actual sensors (e.g., including a tracking filter) whose filtered output signals create a sense signal or signals containing the one or two TCR frequencies Fl and Fh. The sensor could be an accelerometer, microphone, or other vibration sensor as previously discussed.

An alternate embodiment that does not use an RPM sensor could simply include a tracking filter or filters on a sensor output to find the TCR peak or peaks between 180 and 250 Hz. Other methods and techniques of applying filters to a signal in order to determine the highest amplitude peaks are possible. The TCR is the one peak or two peaks with the highest amplitudes in this frequency region. This sensor could be an accelerometer mounted on the wheel hub, control arms, chassis, vehicle interior, etc. This sensor could be a microphone that could be mounted near the tire, in the wheel well for example. Alternately, the microphone could be mounted at nearly any location in the passenger cabin, if the sole goal is to determine the TCR frequency or frequencies. Preferred locations include, but are not limited to, the headliner above a passenger's head, in seat backs, in head rests, etc. From this sensor data the TCR frequency or frequencies can be extracted, and a lookup table can be optionally constructed vs. vehicle speed. In addition, it is possible that the data in an existing lookup table of RPM or speed vs. TCR frequency or frequencies can be refined using data from the aforementioned filtered sensor output technique. In either case, the frequency data from this lookup table can be used by a frequency generator in the manner outlined in other embodiments. Alternately, the filtered signal or signals can be used directly as the sense signal or signals, in the aforementioned manner.

An alternate embodiment can solve the problem of the TCR having a slightly low Q resonance. In this case, the filtered signal will not have sufficient bandwidth in frequency to cancel the entire frequency range of the TCR. In this case, it may be beneficial to synthesize sense signals at frequencies just above and or just below the TCR frequency. Active noise control filter or filters will generate antinoise signal or signals from these sense signal or signals, and a loudspeaker will convert them into antinoise to reduce the noise due to the tire cavity resonance at a listening position. This method may be undertaken with either or both Fh and Fl to reduce the noise due to the TCR at a listening position.

Other methods to determine the wheel RPM are possible. This includes knowledge of the drive shaft RPM and appropriate gear ratios. An alternate method to infer wheel RPM is knowledge of the wheel size and the speed of the vehicle derived from controller area network (CAN) messages or GPS data, etc. It is possible to construct a lookup table of wheel diameter vs. RPM vs. TCR frequency vs. speed. Then, using sensors such as machine vision, or data available on the CAN bus, the appropriate frequency data can be retrieved by the system with input from any or some of these alternate sensors.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those skilled in the art upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In summary, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire cavity resonance (TCR) noise control system comprising:
    a rotational sensor configured to infer a rotational rate of a tire of a vehicle;
    a tire cavity resonance cancellation lookup table configured to map the rotational rate of the tire to one or more corresponding tire resonance frequencies;
    a frequency generator configured to synthesize a frequency corresponding to a tire cavity resonance according to the rotational rate of the tire to generate a sense signal, wherein the frequency generator is configured to use the tire cavity resonance cancellation lookup table to identify the frequency corresponding to the tire cavity resonance by looking up the tire rotation rate in the tire cavity resonance cancellation lookup table and identifying the frequency as a first one of the one or more corresponding tire resonance frequencies for the tire spinning at the tire rotational rate;
    an active noise control filter configured to generate an antinoise signal from the sense signal;
    a loudspeaker configured to convert the antinoise signal into antinoise and to radiate the antinoise to a listening position; and
    a processor programmed to
        receive an input signal from a vibration sensor,
        find a tire cavity resonance peak of the received input signal in a frequency range using a tracking filter receiving input from the vibration sensor,
        identify the rotational rate of the tire by using the rotational sensor, and
        update the tire cavity resonance cancellation lookup table to map the tire cavity resonance peak to the tire rotation rate of the tire,
    wherein the antinoise signal is configured so that the antinoise reduces noise due to the tire cavity resonance at the listening position.

2. The TCR noise control system of claim 1, wherein the one or more corresponding tire resonance frequencies include a plurality of corresponding tire resonance frequencies, and further comprising:
    a second frequency generator configured to synthesize a second frequency corresponding to a second tire cavity resonance according to the rotational rate of the tire to generate a second sense signal, wherein the second frequency generator is configured to use the tire cavity resonance cancellation lookup table to identify the second frequency corresponding to the second tire cavity resonance by looking up the tire rotation rate in the tire cavity resonance cancellation lookup table and identifying the second frequency as a second one of the one or more corresponding tire resonance frequencies for the tire spinning at the tire rotation rate; and a second active noise control filter configured to generate a second antinoise signal from the second sense signal, wherein the loudspeaker is further configured to convert the second antinoise signal into second antinoise and to radiate the second antinoise to the listening position so that the second antinoise reduces the noise at the listening position due to the second tire cavity resonance.

3. The TCR noise control system of claim 2, wherein the frequency corresponding to the tire cavity resonance includes a first tire mode resonance frequency, and the second frequency corresponding to the second tire cavity resonance includes a second tire mode resonance frequency.

4. The TCR noise control system of claim 1, further comprising a second loudspeaker configured to convert the antinoise signal into the antinoise and to radiate the antinoise to a second listening position, wherein the antinoise signal is configured so that the antinoise reduces the noise due to the tire cavity resonance at the second listening position.

5. The TCR noise control system of claim 1, further comprising:
a microphone configured to receive an audio signal indicative of the noise emanating from the tire; and
wherein the processor is further configured to
receive the audio signal,
identify a center frequency of a high Q peak, and
dynamically adjust the tire cavity resonance cancellation lookup table according to the center frequency.

6. The TCR noise control system of claim 1, further comprising:
a microphone configured to receive an audio signal indicative of the noise emanating from the tire; and
wherein the processor is further configured to receive the audio signal and dynamically adjust the frequency generator to achieve a lowered tire cavity resonance pressure.

7. The TCR noise control system of claim 1, wherein the active noise control filter comprises:
a controllable filter; and
a filter controller configured to control the controllable filter.

8. The TCR noise control system of claim 7, further comprising a microphone disposed in an interior of the vehicle and configured to provide a microphone signal, wherein the filter controller is further configured to control the controllable filter according to the microphone signal.

9. The TCR noise control system of claim 7, wherein the filter controller is configured to control the controllable filter according to a least means squares (LMS) algorithm.

10. The TCR noise control system of claim 1, wherein the tire cavity resonance cancellation lookup table specifies the tire rotation rate as axle rotation revolutions per minute of an axle of the tire.

11. A tire cavity resonance (TCR) noise control method comprising:
inferring a rotation rate of a tire of a vehicle using a rotational sensor;
utilizing a tire cavity resonance cancellation lookup table having a plurality of entries, each of the entries mapping one of a plurality of tire rotation rates to one or more corresponding tire resonance frequencies for the tire spinning at that respective tire rotation rate, to identify a frequency of a tire cavity resonance of the tire by looking up the tire rotation rate in the plurality of tire rotation rates and identifying the frequency as a first one of the one or more corresponding tire resonance frequencies;
synthesizing the frequency of the tire cavity resonance of the tire, using a frequency generator, according to the rotation rate of the tire to generate a sense signal;
generating an antinoise signal from the sense signal using an active noise control filter;
converting, by a loudspeaker, the antinoise signal provided by the active noise control filter into antinoise and radiating the antinoise to a listening position;
receiving an input signal from a vibration sensor;
finding a tire cavity resonance peak of the received input signal in a frequency range using a tracking filter receiving input from the vibration sensor;
identifying the tire rotation rate of the tire by using the rotational sensor; and
updating the tire cavity resonance cancellation lookup table to map the tire cavity resonance peak to the tire rotation rate of the tire.

12. The TCR noise control method of claim 11, wherein the one or more corresponding tire resonance frequencies include a plurality of corresponding tire resonance frequencies, and further comprising:
utilizing the tire cavity resonance cancellation lookup table to identify a second frequency of the tire cavity resonance of the tire by looking up the tire rotation rate in the plurality of tire rotation rates and identifying the second frequency as a second of the one or more corresponding tire resonance frequencies;
synthesizing the second frequency of the tire cavity resonance of the tire, using a second frequency generator, according to the rotation rate of the tire to generate a second sense signal;
generating a second antinoise signal from the second sense signal using a second active noise control filter; and
converting, by the loudspeaker, the second antinoise signal provided by the second active noise control filter into the antinoise and radiating the antinoise to the listening position.

13. The TCR noise control method of claim 11, further comprising:
receiving, from a microphone, an audio signal indicative of tire cavity resonance noise emanating from the tire;
identifying a center frequency of a high Q peak by a processor; and
dynamically adjusting the tire cavity resonance cancellation lookup table according to the center frequency and the inferred rotation rate of the tire.

14. The TCR noise control method of claim 11, further comprising:
providing a microphone signal from a microphone disposed in an interior of the vehicle; and
further controlling the active noise control filter according to the microphone signal.

15. The TCR noise control method of claim 14, further comprising controlling a controllable filter of the active noise control filter according to a least means squares (LMS) algorithm.

16. The method of claim 11, wherein the tire cavity resonance cancellation lookup table specifies the tire rotation rate as axle rotation revolutions per minute of an axle of the tire.

* * * * *